United States Patent [19]

Mietzel et al.

[11] Patent Number: 4,784,057
[45] Date of Patent: Nov. 15, 1988

[54] TANDEM DRUM CLUSTER SEPARATOR

[75] Inventors: Dennis O. Mietzel, Columbus; R. Kevin Wells, Madison, both of Wis.

[73] Assignee: Hughes Company, Columbus, Wis.

[21] Appl. No.: 178,424

[22] Filed: Apr. 6, 1988

[51] Int. Cl.⁴ .................. A23N 15/02; A47J 21/00
[52] U.S. Cl. .................................... 99/638; 99/640; 130/30 R
[58] Field of Search ............... 99/635, 636, 637–640; 130/30 R, 30 B; 209/3.1, 683

[56] References Cited

U.S. PATENT DOCUMENTS

| | | |
|---|---|---|
| 1,414,889 | 5/1922 | Navarre . |
| 1,743,240 | 1/1930 | Ryder . |
| 1,897,664 | 2/1933 | Hansen . |
| 2,693,834 | 11/1954 | Frova . |
| 3,059,648 | 10/1962 | Burton . |
| 3,194,243 | 7/1965 | Cota . |
| 3,405,750 | 10/1968 | Weirauch . |
| 3,412,736 | 11/1968 | Olney . |
| 3,645,271 | 2/1972 | Arve et al. ................. 130/30 R |
| 3,797,503 | 3/1974 | Dentant et al. ............ 130/30 R |
| 4,131,062 | 12/1978 | Kumandan ..................... 99/638 |

OTHER PUBLICATIONS

George C. Olney, Inc. Bulletin No. 81SB26, date unknown.
Hughes Company, Inc. Cluster Cutter Advertisement, date unknown.
Key Equipment Co. Form No. 115-675, date unknown.
Chisholm-Ryder Co., Inc. Bulletin 105-59, date unknown.
A. R. Robins and Company, Inc. brochure, pp. 86-87 showing Chisholm-Ryder Co., Inc. (CRCO) Model 800 Cluster Cutter, date unknown.

Primary Examiner—Timothy F. Simone
Attorney, Agent, or Firm—Lathrop & Clark

[57] ABSTRACT

A cluster seprator for engaging and separating clusters of pod vegetables joined together by stem sections from a large quantity of individual pod vegetables, includes two tandem substantially horizontally spaced drums which each have a cylindrical surface such that the two drums form a restricted zone between the cylindrical surfaces. The drums are rottable in opposite directions so that the cylindrical surfaces move in the same direction at the restricted zone. On each drum are hooked rods which extend generally radially outwardly from the cylindrical surface so that a hook portion of each rod faces generally upwardly within the restricted zone. The hooked rods on each drum form an array of rods of selected density. The hooked rods pass juxtaposedly through the restricted zone at the combined densities of the arrays of both drums to optimize engagement of the clusters of pod vegetables falling through the restricted zone while permitting individual pod vegetables to fall freely between the rods. As the drums rotate, the hooked rods pass outwardly and away from the restricted zone at the respective single array density of each drum so that the clusters may be cut apart or otherwise processed more efficiently. A drive system is connected to the drums to rotate them.

22 Claims, 8 Drawing Sheets

TANDEM DRUM CLUSTER SEPARATOR

BACKGROUND OF THE INVENTION

1. Field of the Invention

This invention relates to separating devices for agricultural products. More specifically, the present invention relates to devices which are used to separate clusters of pod vegetables joined together by stem sections from a large quantity of pod vegetables.

2. Description of the Prior Art

Vegetable pod cluster separators, breakers and cutters are well known and have various different types of designs. For example, U.S. Pat. Nos. 4,131,062 to Kumandan and 3,405,750 to Weirauch disclose using forks, hooks or slotted peripheral annular disks within a drum to catch and carry vegetable pod clusters to a blade, sickle cutter, or comb which cuts or breaks the pods away from the stems. U.S. Pat. Nos. 1,743,240 to Ryder, 3,059,648 to Burton, and 3,645,271 to Arve, et al. disclose using pins or lifting vanes within a rotating drum to catch and lift clusters upwardly within the drum to where they are dropped on a conveyor which removes the clusters from the drum, or onto cross bars which are chain driven or wires which carry the clusters to a sickle cutter which cuts the pods away from the stems.

Another type of device for separating and trimming clusters of beans from their stems is disclosed in U.S. Pat. No. 3,412,736 to Olney. The device disclosed includes first and second separating zones and belt mounted hooked rods which extend into the zones and move downwardly through the zones to catch the clusters by their stems as they fall. The rods carry the clusters downwardly to sickle cutters which cut the pods from their stems. A blower separates the stems and leaves from the pods.

A "piggyback" two drum cluster cutter has been built which includes two drums, one mounted vertically over the other, wherein each drum has hooked rods extending out from its cylindrical surface into the restricted zone through which the vegetable pods and clusters fall. As they fall through the restricted zone they encounter two separate sets of hooked rods, one set after another. In this cluster cutter, each drum rotates so that the hooked rods move downwardly with any clusters that are caught, and then outwardly to a sickle cutter which cuts the vegetable pods from the cluster stems. The cut vegetable pods eventually drop below, out of the restricted zone. Those clusters which are missed by the hooked rods on the upper drum often are caught by the hooked rods on the lower drum. A modified Olney device has been developed in which the second separating device has been replaced by a drum-type cluster separator and cutter similar to one of the two drums and sickle cutters of the above-described "piggyback" apparatus.

The prior art demonstrates that doubling of the number of locations where separation of clusters occurs, such as in the Olney device, the "piggyback" cluster cutter, and the modified Olney device, may result in increased capacity and efficiency. Since such a device will have a "second chance" at removing clusters, the vegetable pods may be fed into the device at a rate greater than the rate at which substantially all the clusters are removed at the first location. It is desirable, however, to be able to accomplish the cluster separation at an even more effective rate and within a more compact and limited space which cannot accomodate multiple separation locations. While theoretically this could be accomplished by increasing the density of the array of hooked rods on a drum, in practice it has been found that optimal hook spacing limits the density of the hooked rods on a drum to prevent clusters and separated vegetable pods from "bridging" adjacent hooks. Such "bridging" results in single vegetable pods being separated and cut with the clusters, and cluster portions remaining on the closely adjacent hooks even after cutting. In addition, an overly dense hooked rod array can cause the drum to deliver such a large number of clusters and pods to the sickle cutter that the cutter might jam or be subject to excessive wear.

SUMMARY OF THE INVENTION

The present invention is summarized in that a tandem drum cluster separator includes two horizontally spaced tandem drums which each include a cylindrical portion with a cylindrical surface. The two drums together form a restricted zone between their cylindrical surfaces and are mounted to be rotatable in opposite directions, such that the cylindrical surfaces move in the same direction at the restricted zone. The tandem drum cluster separator further includes a set of hooked rods on each drum, and a drive system which is connected to the drums to rotate them. Each hooked rod includes a rod portion and a hook portion, and extends generally radially outwardly from one of the cylindrical surfaces, with the hook portion of each rod facing generally upwardly within the restricted zone. The set of hooked rods on each drum form an array of rods of selected density such that the two sets of rods pass juxtaposedly through the restricted zone at the combined density of both arrays of rods to optimize the engagement of the clusters by the rods as the vegetable pods fall through the restricted zone. As the drums rotate, the hooked rods pass outwardly away from the zone at the respective single array density of each drum so that the clusters are carried away from the zone at a lesser density than in the restricted zone. The tandem drum cluster separator may further include a sickle cutter assembly located below each drum in generally parallel relationship to the axis of the drum. Each sickle cutter faces inwardly toward the other drum to receive the clusters moving outwardly from the restricted zone and to cut the vegetable pods from the stems so that the pods fall and the stems are carried outwardly to be dropped separately when the hooked portions of the hooked rods face generally downwardly.

A primary object of the invention is to provide a tandem drum cluster separator which doubles the density of the hooked rods in the restricted zone where the clusters are separated from the vegetable pods.

A further object of the invention is to provide a tandem drive cluster separator for which the density of the hooked rods carrying clusters to be cut at the sickle cutter assembly is half the density of the hooked rods where the clusters are caught within the restricted zone.

Another object of the invention is to provide a compact, high capacity tandem drum cluster separator which efficiently separates the clusters from the vegetable pods at a single confined separator zone.

Yet another object of the invention is to provide a tandem drum cluster separator which directs separated clusters in two different directions for processing so that the clusters can be cut or otherwise processed at a faster and more effective rate than if the separated clusters were directed in a single direction.

Other objects, features, and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
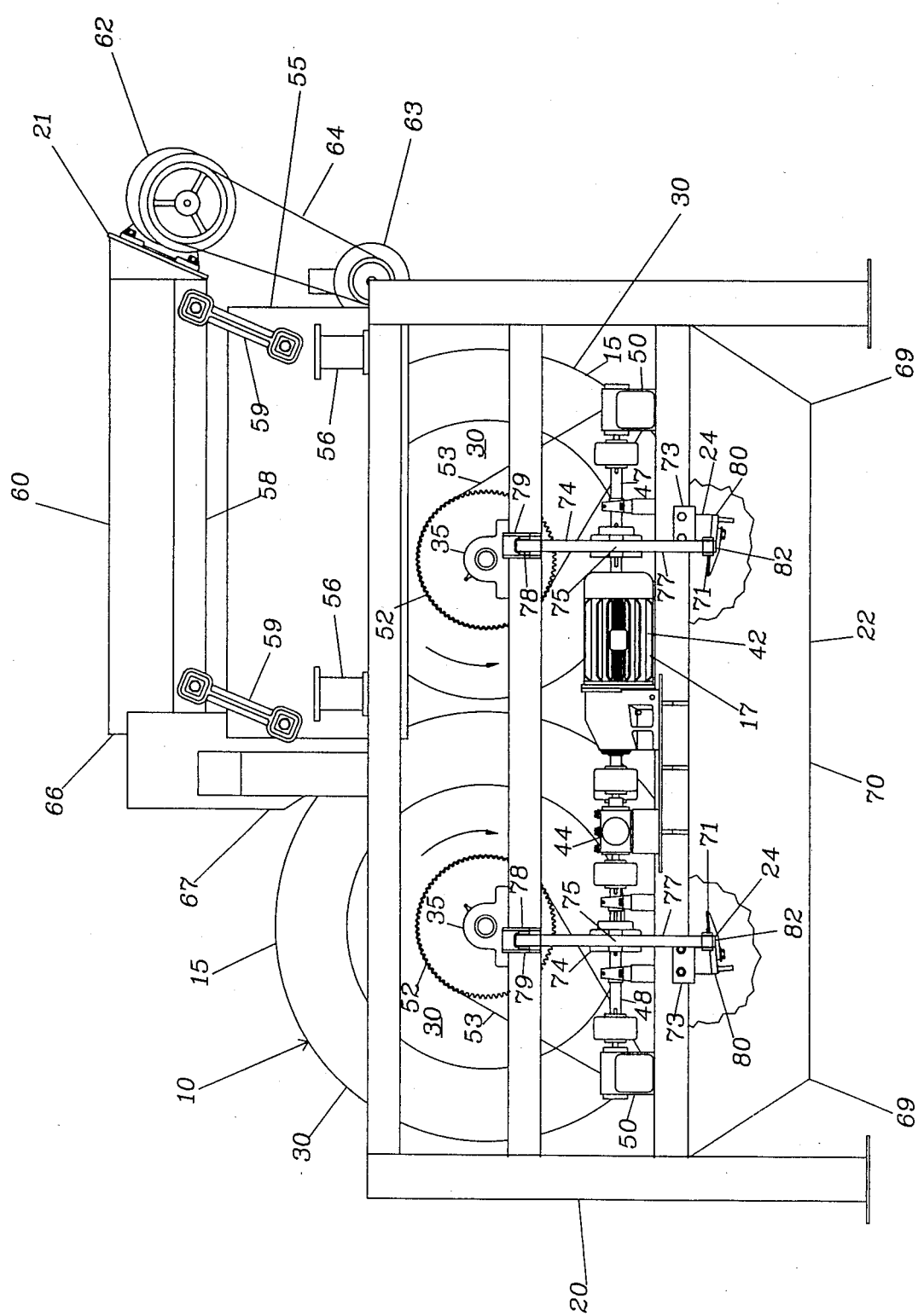
FIG. 1 is a front elevation view showing the tandem drum cluster separator.
Figure 2:
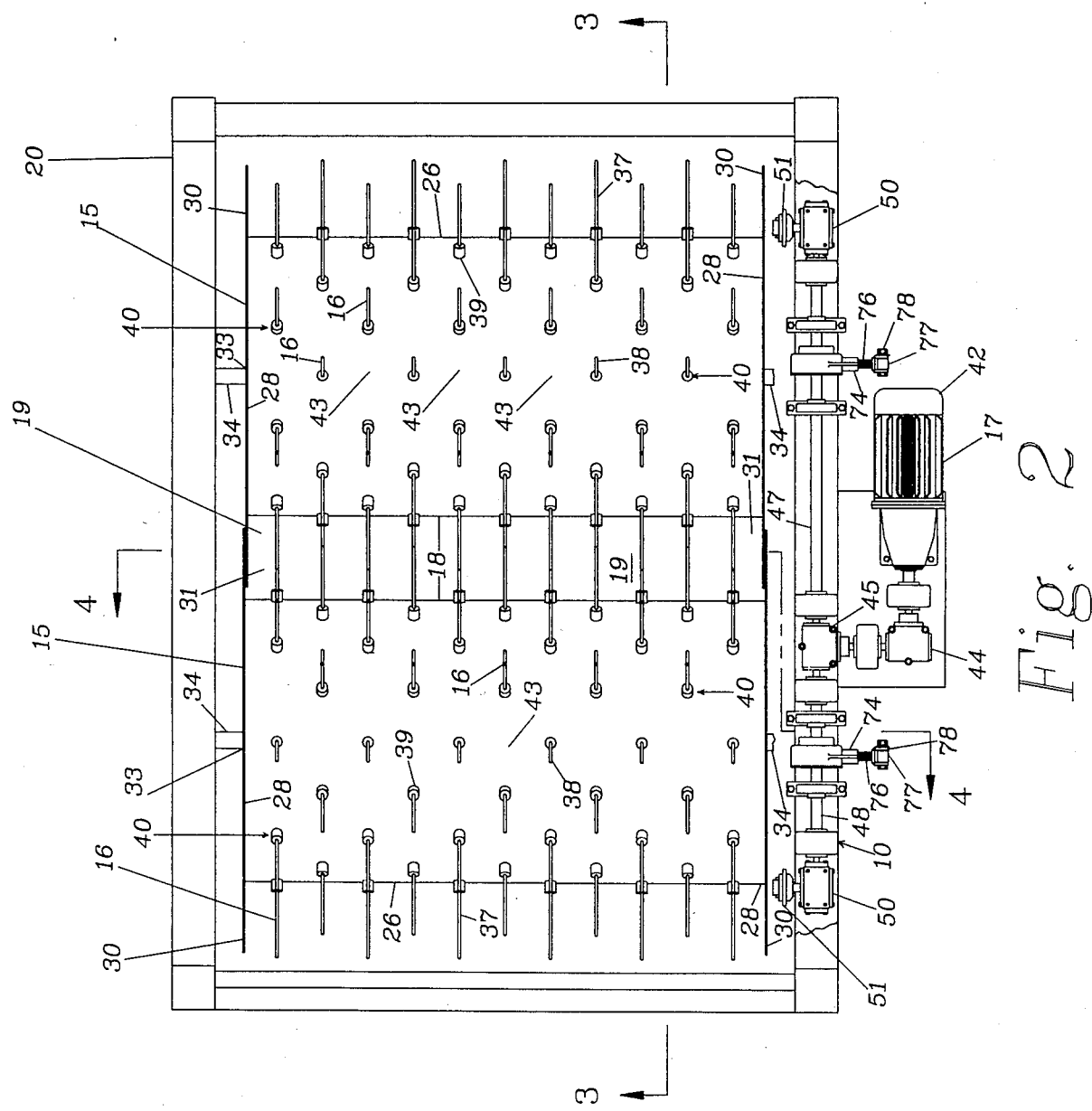
FIG. 2 is a top plan view of the tandem drum cluster separator with the vibrating feed assembly removed, with part of the frame cut away to expose the drive system.
Figure 3:
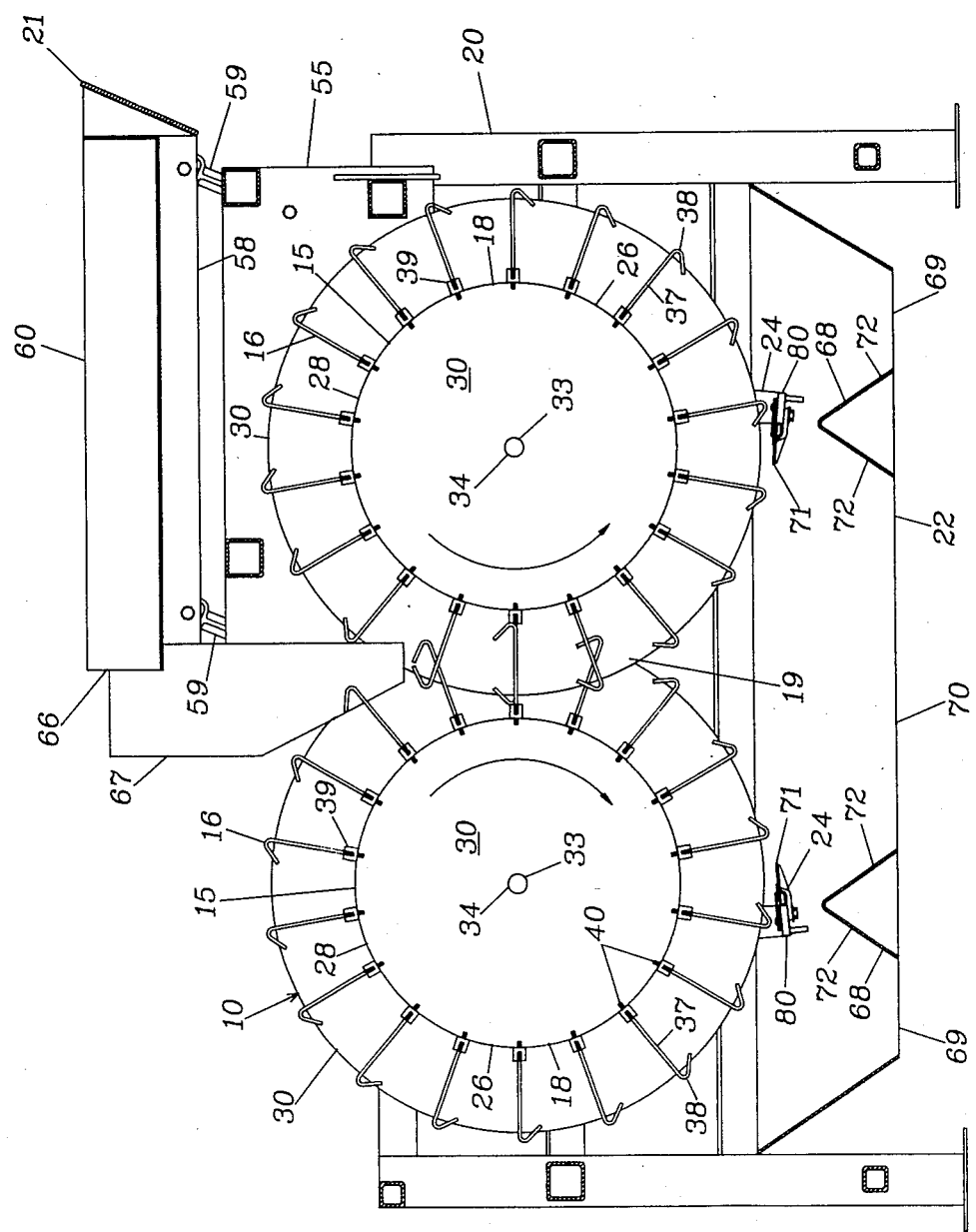
FIG. 3 is a section view of the tandem drum cluster separator taken along section line 3—3 of FIG. 2, including the vibrating feed assembly.
Figure 5:
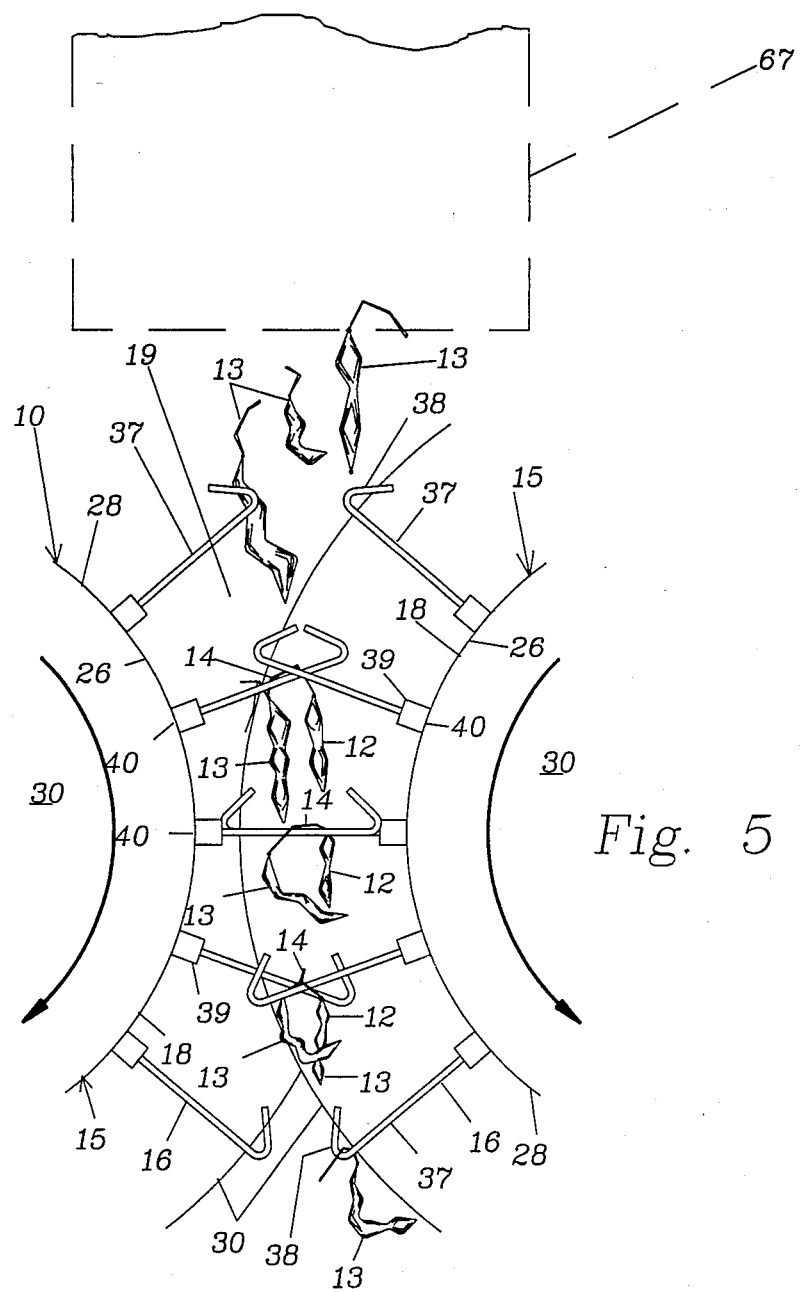
FIG. 5 is a fragmentary view of clusters being caught on the hooked rods within a restricted zone between the tandem drum, and of vegetable pods falling through the zone.
Figure 6:
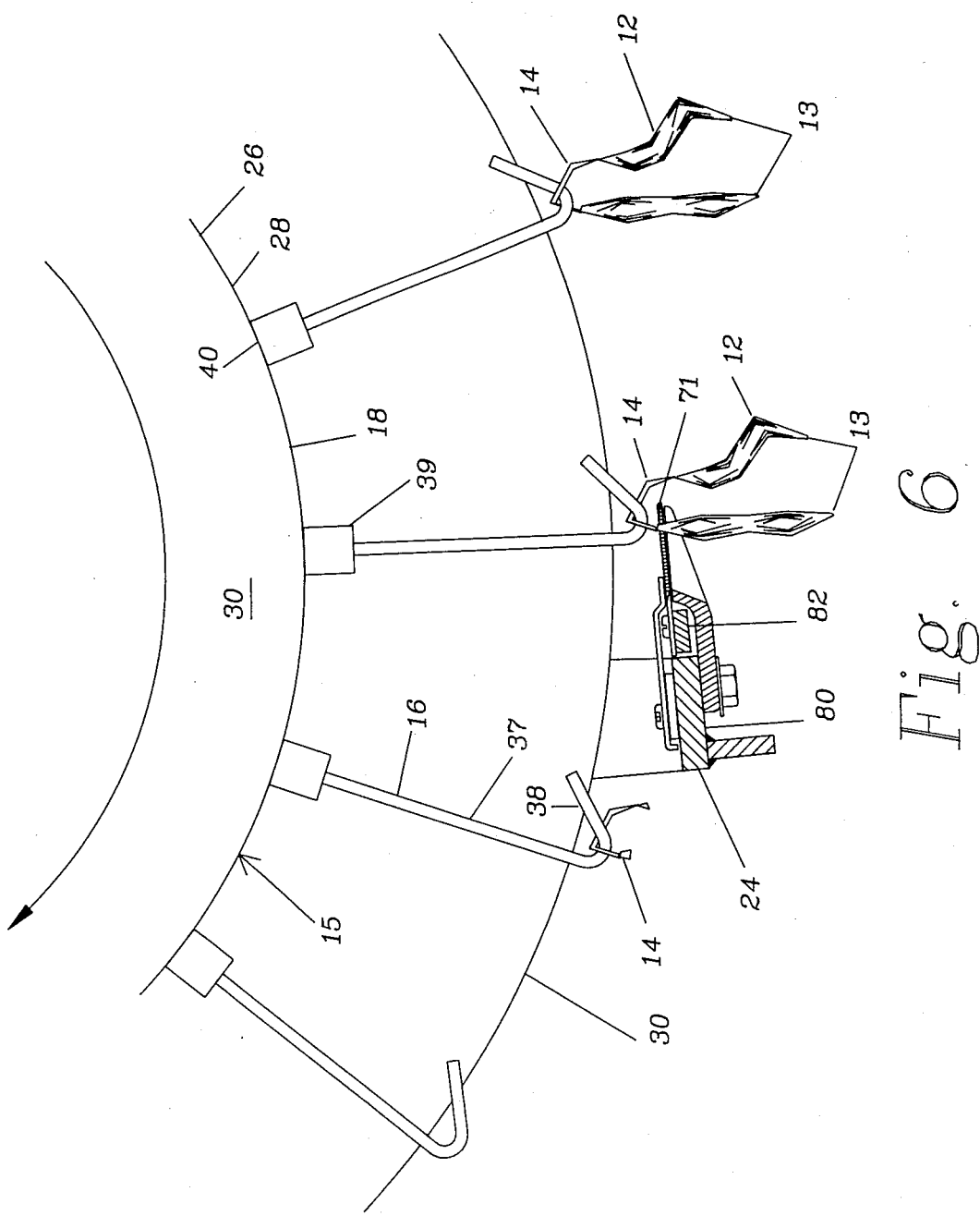
FIG. 6 is an enlarged fragmentary view showing hooked rods carrying clusters to be cut by a sickle cutter.

Referring more particularly to the drawings, wherein like numbers refer to like parts, FIG. 1 shows the tandem drum cluster separator 10 for engaging and separating clusters of pod vegetables joined together by stems from a large quantity of vegetables. FIG. 5 shows the clusters 12 of pod vegetables joined together by stems 14 being caught and separated from the single vegetable pods 13. Referring to FIGS. 2 and 3, the preferred tandem drum cluster separator 10 includes two substantially horizontally spaced tandem drums 15, hooked rods 16 on each drum 15 and a drive system 17 which is connected to the drums 15 to rotate them. Each tandem drum 15 has a cylindrical surface 18. The cylindrical surfaces 18 of the two drums 15 together form a restricted zone 19 through which the vegetable pods 13 fall. The preferred tandem drum cluster separator 10 also includes a frame 20, a vibrating feed assembly 21 which is located above the restricted zone 19 to feed the vegetable pods 13 into the restricted zone 19, and a hopper 22 which is located below the restricted zone 19 to catch the vegetable pods 13 after they have fallen through the zone 19. As shown in FIGS. 1 and 6, the preferred separator 10 may also include two sickle cutter assemblies 24 which are each located below one of the two drums 15 in generally parallel relation to an axis of the drum 15 facing inwardly toward the other drum 15 to receive the clusters 12 as the clusters move outwardly from the restricted zone 19. The sickle cutter assemblies 24 then cut the vegetable pods 13 from the stems 14 so that the pods 13 fall into the hopper 22 and the stems 14 are carried outwardly and upwardly to be dropped.

Figure 4:
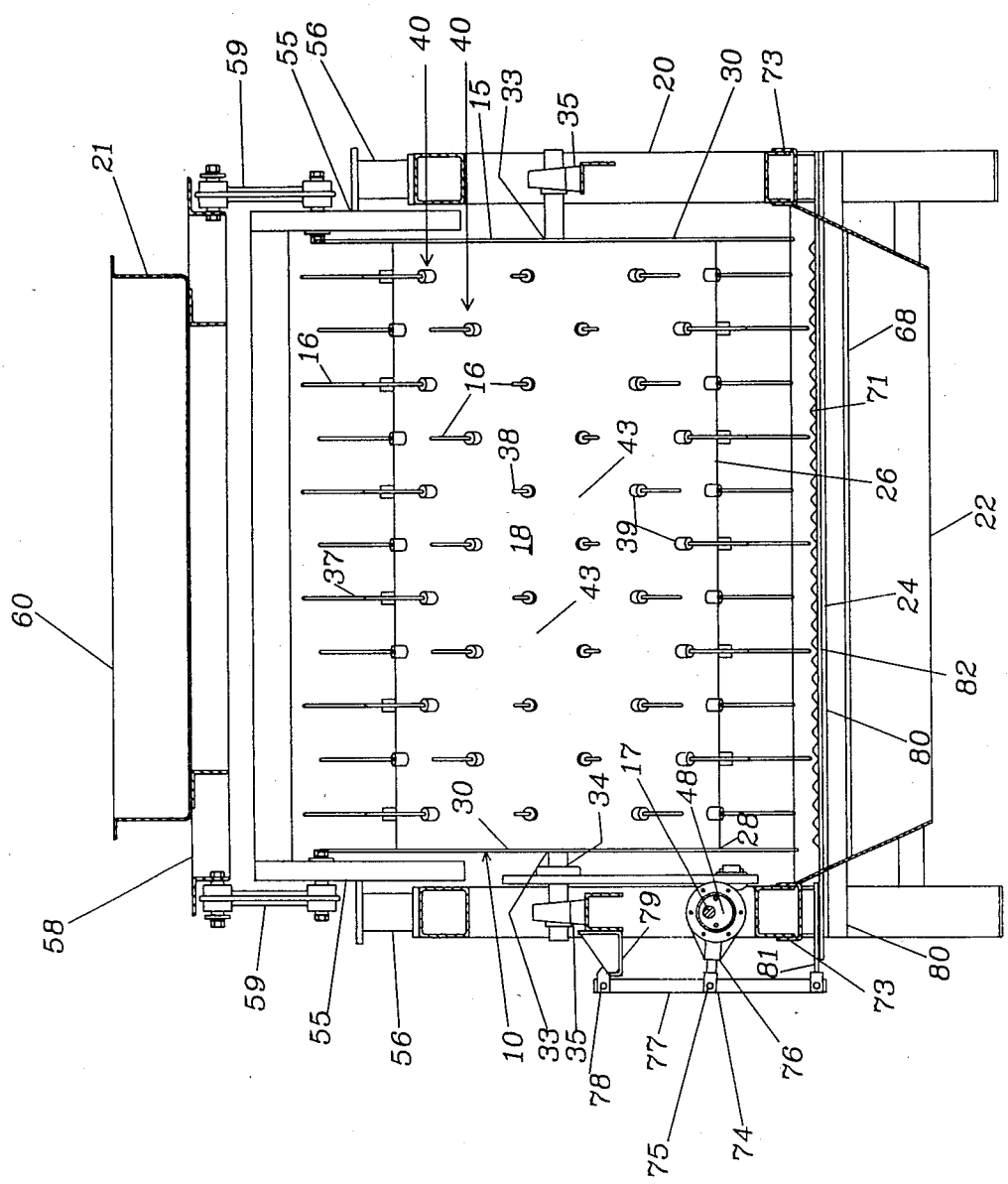
FIG. 4 is a section view of the tandem drum cluster separator taken along section line 4—4 of FIG. 2, including the vibrating feed assembly which also in shown is section.

The two tandem drums 15 each include a cylindrical portion 26 which forms the cylindrical surface 18, and two end guards 30 which are respectively connected to the two ends 28 of the cylindrical portion 26 as shown in FIG. 2 and 3. Each end guard has a substantially larger radius than the cylindrical portion 26 of the drum 15 so that the end guard 30 extends radially outward beyond the cylindrical surface 18. Thus each end guard 30 extends outwardly from the drum cylindrical portion 26 in overlapping relation to an end guard 30 of the adjacent drum to substantially enclose the restricted zone 19, as shown in FIGS. 1–2 and 3. Each end guard 30 has a central hole 33 therethrough for receiving one drum shaft 34 which extends axially through each drum 15 as shown in FIGS. 1–2, and 4. The two tandem drums 15 are pivotally mounted to the frame 20 of the preferred separator 10 so as to be rotatable in opposite directions such that the cylindrical surfaces 18 move downwardly in the restricted zone 19. Note that the cylindrical surfaces 18 each form a continuous closed looped surface of which a portion is always moving through and defining the restricted zone 19 as the drums 15 rotate. As shown in FIG. 1, the drum shafts 34 are pivotably mounted to the frame 20 by the pillow blocks 35.

Located on each drum are the hooked rods 16 which each include a rod portion 37 and a hook portion 38 which form an acute angle with respect to each other. Each hooked rod 16 extends generally radially outwardly from one of the cylindrical surfaces 18 so that the hook portion 38 of each rod 16 faces generally upwardly as the rod 16 passes downwardly through the restricted zone 19 when the drums 15 rotate. Each hooked rod 16 has a length which is slightly less than the shortest distance between the cylindrical surfaces 18 of the two drums 15 so that each hooked rod 16 extends from one drum surface 18 substantially across the narrowest width of the restricted zone 19 without contacting the other drum surface. The hooked rods 16 are connected to the cylindrical surface 18 through a resilient flexible member 39 which allows the hooked rod 16 to be temporarily pivoted slightly instead of becoming damaged when the rod 16 encounters resistance to its movement. Flexible fasteners such as those known under the trademark "Rivnuts" may be used to connect the hooked rods 16 to the cylindrical portion 26.

The set of hooked rods 16 on drum cylindrical surface 18 are arranged so as to form an array of hooked rods 16 having a certain selected density as is best shown in FIG. 2. Thus the two sets of hooked rods 16 pass juxtaposedly through the restricted zone 19 at the combined densities of the arrays of hooked rods 16 of both drums 15 to optimize engagement of the clusters 12 by the rods 16 as the individual pod vegetables 13 fall freely through the restricted zone and between the rods 16 into the hopper 22 below the zone 19, as shown in FIG. 3. As the drums 15 continue to rotate, the hooked rods 16 pass downwardly and outwardly away from the zone 19 at the respective single array densities of each drum 15 so that the clusters 12 are carried away from the zone 19 at a substantially lesser density than the clusters 12 were at within the restricted zone 19.

As shown in FIG. 2, each array of hooked rods 16 preferably comprises a selected number of rows 40 of rods 16 wherein each row is parallel to the axis of the drum 15. The adjacent hooked rods 16 within each axial row 40 are equidistant, and the adjacent axial rows are equidistant from one another. In the particular embodiments shown in FIGS. 1–8, each drum 15 has an array which is comprised of eighteen axial rows, where the rows alternate between having six and five hooked rods 16 per row. Although this particular array of hooked rods 16 has been chosen for exemplification on the drums 15 in FIGS. 1–8, the arrays of hooked rods 16 could vary from those shown, and in particular, could vary in density (hooked rods per surface 18 area). It is preferred, though, that the adjacent rows be shifted with respect to one another so that locations or points 43 which are midway between two adjacent rods 16 in a row 40 lie circumferentially adjacent to a hooked rod 16 in the adjacent row as shown in FIGS. 2 and 4. It also is preferred that the drums 15 be rotationally positioned with respect to each other so that, within the restricted zone 19, the locations 43 which are midway between two adjacent hooked rods 16 of each drum 15 are substantially occupied by hooked rods 16 of the other drum 15. In other words, each midpoint 43 on a drum 15 is directly opposite a hooked rod 16 on the other drum 15 when the point 43 passes through the narrowest part of the restricted zone 19. Alternatively, the rows 40 on the two drums could be offset or staggered so that the rows 40 on one drum will always pass between rows 40 on the other drum. Any rod pattern which presents a relatively uniform combined array of hooked rods in the restricted zone is suitable.

As shown in FIGS. 1 and 2, the two tandem drums 15 are driven by a drive system 17. In the particular embodiment shown for exemplification in FIGS. 1–6, the drive system 17 includes the motor 42 which is attached to two gear boxes 44 and 45 which are connected to both a long drive shaft 47 and a shorter drive shaft 48 which each in turn are connected to the worm gears shown at 50. In addition, the drive system 17 further includes the small sprockets 51 which are connected to the worm gears 50, the large gears 52 which are drivingly connected to the drums 15, and the roller chains 53 which interconnect each small sprocket 51 to a large gear 52. Alternatively, various different types of drive systems which are commonly known in the art could be used to rotate the tandem drums 15 in opposite directions from one another. In the embodiment shown in FIGS. 1–6, the drive system 17 preferably rotates the drums 15 so that the drum cylindrical surfaces 18 and the hooked rods 16 move downwardly within the restricted zone 19.

The vibrating feed assembly 21 is located above the restricted zone 19, and includes the vibrating pan assembly frame 55 which is connected to the frame 20 through the interconnecting resilient marshmallow feet 56, and a pan frame 58 which is connected to the vibrating pan assembly frame 55 through the shaker dog bones 59 which allow the pan frame 58 to vibrate with respect to the assembly frame 55. The vibrating feed assembly 21 further includes the pan 60 which lies within the pan frame 58, the shaker 62 which is connected to the pan frame 58, and the motor 63 which is mounted to the vibrating pan assembly frame 55 to drive the shaker 62 through the belt 64. The pan 60 has a discharge edge 66 above the restricted zone 19 over which the vegetable pods 13 fall into the restricted zone 19. The feed hopper drop chute 67 guides the vegetable pods 13 into the restricted zone 19. The chute 67 is respresented in dashed lines in FIG. 5, which shows the vegetable pods 13 falling through the restricted zone 19, with the clusters 12 being caught. The device as embodied in FIGS. 1–8 includes the vibrating feed assembly 21. Alternatively, another type of feed assembly could be utilized which drops the vegetable pods 13 into the restricted zone 19 at an appropriate controlled feed rate.

Located below the restricted zone 19 is the hopper 22 which catches the vegetable pods 13 after they have fallen through the restricted zone 19. The hopper 22 is connected to the frame 20 of the separator 10. As shown in FIG. 3, the hopper 22 is subdivided by the dividers 68 into two end portions 69 and a central portion 70. The central portion 70 is located inwardly from the sickle cutter assemblies 24 so that any vegetable pods 13 falling through the restricted zone 19 are collected in the hopper 22. The sides 72 of the divider 68 are sloped so that the vegetable pods 13 which are cut from stems 14 of clusters 12 by the sickle cutter assemblies 24 also fall into the central portion 70 of the hopper 22. The stems 14 are carried by the hooked rods 16 past the sickle cutter assemblies 24 and then are dropped into the end portions 69 of the hopper 22. Although the tandem drum cluster separator 10 includes the hopper 22 as shown in FIGS. 1, and 3–4, another structure, container or mechanism could be used to receive the vegetable pods 13. For example, one such mechanism which could be used in place of or in addition to the hopper 22 would be a conveyor which would transport the pods 13 elsewhere for further processing. The pods 13 could also be dropped onto the floor and then be periodically removed.

The tandem drum cluster 12 separator 10 as shown in FIGS. 1–4 and 6 includes sickle cutter assemblies 24 which are each located below one of the drums 15 in parallel relation to the axis of the drum 15. Each sickle cutter assembly 24 includes a sickle cutter 71 which extends substantially along the entire periphery of the adjacent drum 15 in spaced relation and faces inwardly toward the other drum 15. As the tandem drums 15 rotate, the hooked rods 16 move downwardly through the restricted zone 19 as shown in FIG. 5, where at least some of the rods 16 catch clusters 12 which are retained on their hook portions 38. As the drums 15 rotate, the hooked rods 16 carry the clusters 12 to the sickle cutters 17 which each face inwardly toward the other drum to receive the clusters 12 as they move outwardly away from the restricted zone 19 as shown in FIGS. 3 and 6. The sickle cutters 17 cut the vegetable pods 13 from the stems 14 so that the pods 13 fall into the central portion 70 of the hopper 22. The rods 16 continue to carry many of the stems 14 forwardly and unpwardly until the hooked portions 38 of the rods 16 turn downwardly and drop the stems 14 into the end portions 69 of the hopper 22. In order for the sickle cutters 71 to be able to most efficiently cut the clusters 12 which are carried by the hooked rods 16, the axial position of the drums 15 is preferably adjusted and the hooked rods 16 positioned on the drums 15 so that the hooked rods 16 line up with the V's of the sickle cutters 71.

The sickle cutter assembly 24 is attached to the frame 20 by a sickle cutter support member 73 and is operated by the sickle drive assembly 74 as shown in FIGS. 1, 2 and 4. The sickle drive assembly 74 is connected to the drive system 17 which rotates the drums 15 to receive power. As shown in FIGS. 2 and 4, the two sickle drive assemblies 74 each include an eccentric drive rod assembly 76 which is either connected to the long drive shaft 47 or to the shorter drive shaft 38. In each sickle drive assembly 74, a pivot arm 77 is pivotally connected at its middle 75 to the eccentric drive rod assembly 76 and at its upper end 78 to a pivot arm mounting bracket 79 which in turn is connected to the frame 20. Each pivot arm 77 at its lower end is pivotally connected to a sickle push rod 81 which in turn is connected to the sickle driver bar 82 which drives the sickle cutter 71. The sickle cutter 71 is supported by the sickle cutter support bar 80, which in turn is supported at its ends by the sickle cutter support member 73. Shims may be inserted between the sickle push rod 81 and sickle driver bar 82 to make adjustments in the height of the sickle cutter 71.

Although the tandem drum cluster 12 separator 10 as shown in FIGS. 1-4 and 6 includes the sickle cutter assembly 24, alternatively the separator 10 might not include the cutter assembly 24. In such an alternative embodiment, the single vegetable pods 13 would still drop into the central portion 70 of the hopper 22. However, clustered vegetable pods 13 would not be cut from the stems 14 of the clusters 12. The clusters 12 therefore would continue to move outwardly until located over the end portions 69 of the hopper 22 or other structure into which they would drop.

Figure 7:
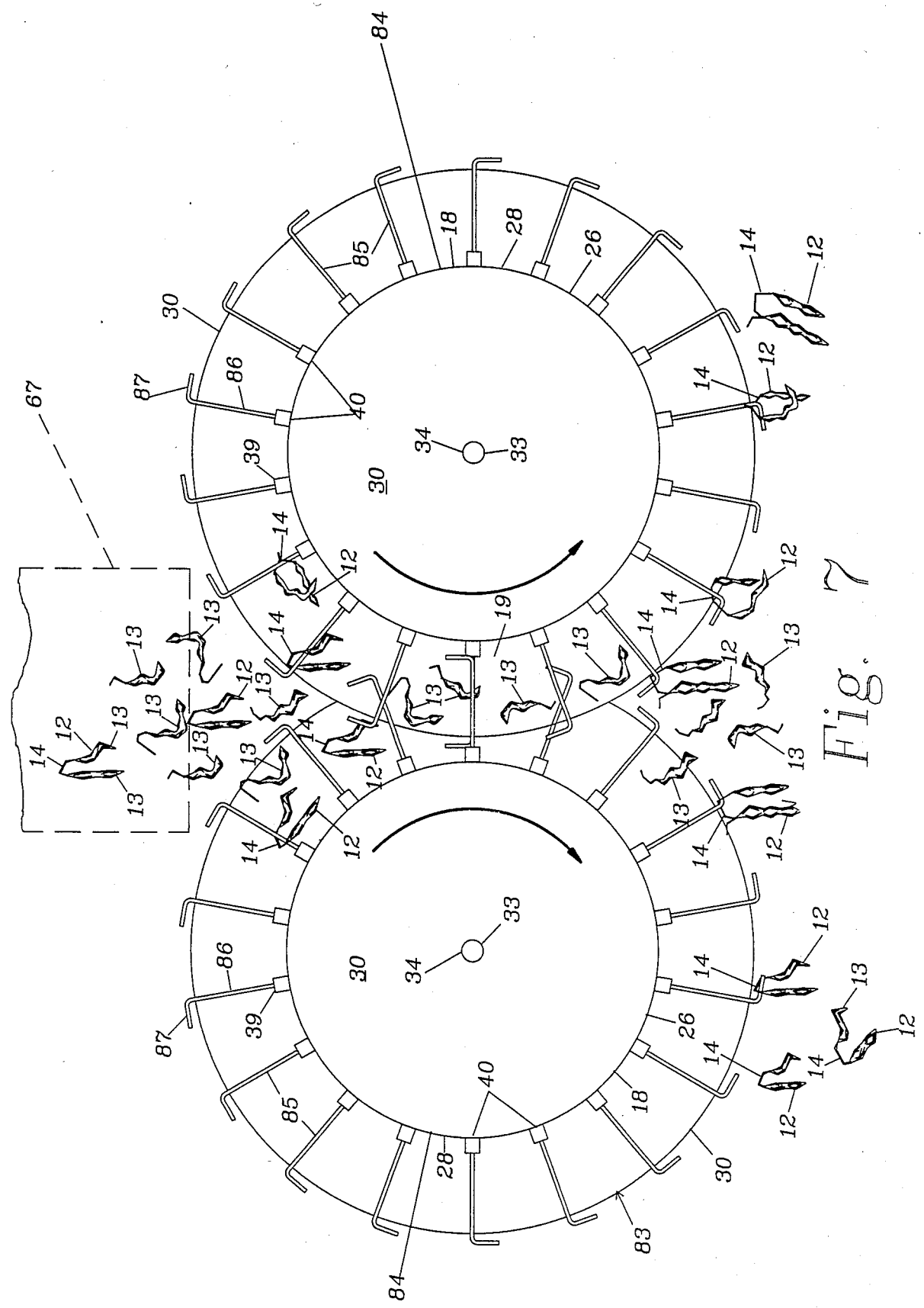
FIG. 7 is a section view of the drums and hooked rods of a modified tandem drum cluster separator without sickle cutters, with modified hooked rods which move downwardly through the restricted zone and permit the separated clusters to drop off the rods at locations remote from the restricted zone.

FIG. 7 shows such an alternative tandem drum cluster separator 83. The separator 83 includes no sickle cutter, and the hooked rods 85 have rod portions 86 and hook portions 87 which join perpendicularly. The drums 15 are rotating so that the hooked rods 85 move downwardly through the restricted zone 19. The hooked rods 85 catch the clusters 12 as they drop through the restricted zone 19, and then carry them outwardly away from that zone 19, and away from the single vegetable pods 13 which fall straight through the zone. Instead of being cut up, the clusters 12 are eventually dropped by the hooked rods 85 as their hook portions 87 begin to point downwardly. The separated clusters 12 may then be subjected to further processing or disposed of as desired.

Figure 8:
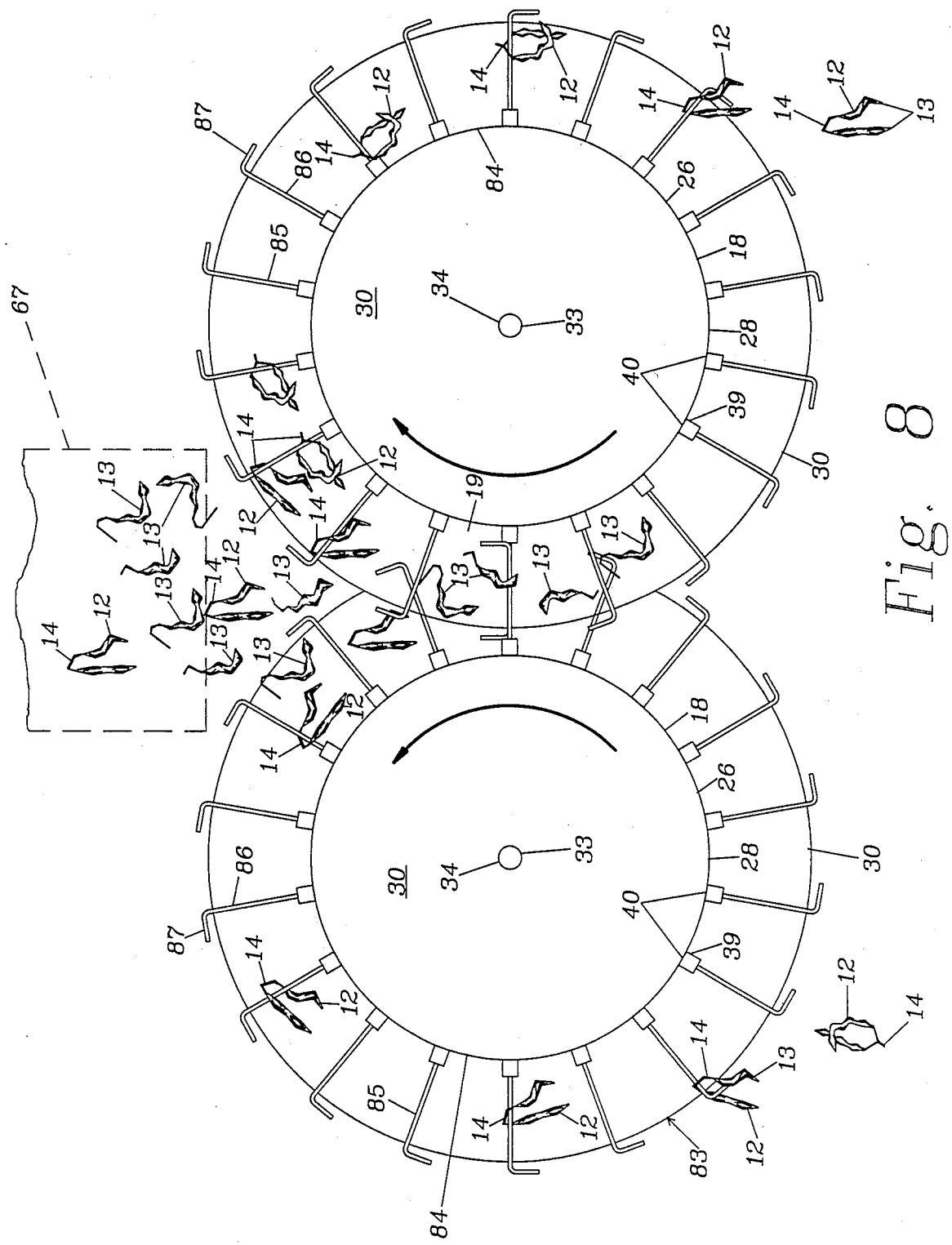
FIG. 8 is a section view of the drums and hooked rods of the modified tandem drum cluster separator with the tandem drums rotating so that the hooked rods move upwardly within the restricted zone, and the vegetable pod clusters are carried over the drums to the outer side of the drums where they fall off the hooked rods.

As shown in FIG. 8, the alternative tandem drum cluster separator 83 can be modified to operate with its hooked rods 85 moving upwardly through the restricted zone, by reversing the rotational direction of the drums 15. The hooked rods 85 then move upwardly within the restricted zone 19 to rake through the falling vegetable pods 13. The hooked rods 85 snag the falling clusters 12 and rake them up and over the drums 15. The clusters 12 then are eventually dropped when the hooked rods 85 are rotated to the outer sides 84 of the drums 15 with hook portions 87 pointed downwardly, as shown in FIG. 8. In any embodiment of the separator in which the drums 15 are rotating so that the hooked rods move upwardly through the restricted zone 19 to merely rake out and separate the clusters 12, the presence or absence of sickle cutters below the drums 15 is irrelevant. Thus, a separator with sickle cutters could be used to merely separate the clusters 12 by reversing the rotation of the drums 15 and, preferably, disengaging the sickle drive assembly.

Although it is preferred that the surfaces to which the sets of hooked rods are attached be cylindrical drums, alternatively some other opposed structures could be used such as belts, without departing from the spirit of the invention. In such an embodiment of the invention, the belts would be so positioned with respect to each other and move such that the two opposed sets of attached hooked rods move juxtaposedly through the restricted zone so that the density of the hooked rods in the zone is equal to the combined densities of both sets. The sets of hooked rods would then exit the restricted zone and separate from one another. Each of the two belts would form a continuous closed looped surface of which a portion is always moving through and defining the restricted zone.

Preferably the tandem drum cluster separator device includes an interconnected lubrication system which enables the operator to lubricate the entire device by applying the lubricant at one or very few locations.

In its use, the preferred tandem drive cluster separator 10 are used for separating clusters 12 of pod vegetables 13 joined together by stems 14 from a large quantity of such vegetables which are fed into the vibrating feed assembly 21 by any suitable conveyor or other mechanism. The motor 63 and shaker 62 cause the pan 60 to vibrate so that the vegetable pods 13 spread out within the pan 60 and exit the opening 66 into the feed hopper drop chute 67 at a fairly even rate. The feed hopper drop chute 67 guides the vegetable pods 13 into the restricted zone 19.

The drive system 17 rotates the tandem drums 15 so that the hooked rods 16 move downwardly in the restricted zone 19 at double density. As the vegetable pods 13 fall through the restricted zone 19, the hooked rods 16 on both drums 15 catch the clusters 12 as they fall, while allowing the vegetable pods 13 to pass through the restricted zone 19 into the hopper 22. As the drums 15 rotate, the hooked rods 16 on each of the two drums 15 separate and move outwardly away from the restricted zone 19, carrying the clusters 12 on their hook portions 38. If the drums 15 rotate so that the hooked rods 16 move downwardly in the zone 19 and there are sickle cutter assemblies 24 on the separator 10, the clusters 12 are carried to the sickle cutter assemblies 24 which cut the vegetable pods 13 away from the stems 14 of the cluster 12 so that the cut vegetable pods 13 fall into the hopper central portion 70. As shown in FIG. 6, the hooked rods 16 continue to carry the stems 14 outwardly past the sickle cutter assembly 24 until the stems 14 are dropped into the end portions 69 of the hopper 22 or into another structure.

As discussed above, if the separator 10 is modified to have no sickle cutter assembly 24, the clusters 12 may simply be carried downwardly and then upwardly to the outside of the hopper central portion 70, and dropped into the end portions 69, or onto the floor or into some other container or device if there are no end portions 69. FIG. 7 demonstrates this operation with the modified separator 83. As shown in FIG. 8, the modified separator 83 can also be operated with its drums 15 rotating so the hooked rods 85 move upwardly through the restricted zone, raking and carrying the clusters 12 so that they are dropped to the outer sides 84 of the drums 15. The clusters 12 are dropped into the hopper end portions 69, or into some other containers, mechanisms, structures, or even onto the floor away from the single vegetable pods 13.

It is apparent that the hooked rods 16 and 85 may have hook portions 38 and 87 of various shapes and sizes, and that any thickening, flange or protuberance extending transversely from the rod portions 37 and 86 should be considered a hook portion or its equivalent.

Likewise, the rod portions 37 and 86 may be of various shapes and configurations without departing from the concept of the invention.

It is to be understood that the present invention is not limited to the particular arrangements and embodiment of parts disclosed and illustrated herein, but embraces all such modified forms thereof as come within the scope of the following claims.

What is claimed is:

1. A cluster separator for engaging and separating clusters of vegetable pods joined together by stem sections from a large quantity of individual vegetable pods, comprising:
   (a) two substantially horizontally opposed surfaces which together define a restricted zone between the surfaces through which a quantity of vegetable pods may fall;
   (b) a set of hooked rods mounted on each opposed surface and extending outwardly therefrom to form an array of rods thereon of selected density;
   (c) means for moving the opposed surfaces to carry the two sets of hooked rods juxtaposedly through the restricted zone at the combined density of both arrays of rods to engage on the hooked rods vegetable pod clusters entrained with the falling vegetable pods while permitting individual pods to fall freely through the combined array of hooks, and then to carry each set of hooked rods separately away from the restricted zone to separate the engaged vegetable pod clusters from the individual vegetable pods prior to further processing.

2. The cluster separator specified in claim 1 wherein each said opposed surface is a continuous closed looped surface which moves continuously past the restricted zone and each set of hooked rods is attached to one continuous closed looped surface, and wherein the means for moving the opposed surfaces comprises a drive system connected to each said closed surface.

3. The cluster separator specified in claim 2 wherein each continuous closed looped surface comprises a cylindrical surface of a drum and the drive system rotates the drums.

4. A cluster separator for engaging and separating clusters of vegetable pods joined together by stem sections from a large quantity of such vegetable pods comprising:
   (a) two substantially horizontally spaced tandem drums which each include a cylindrical portion with a cylindrical surface, the two drums together forming a restricted zone between their cylindrical surfaces and being mounted to a frame of the device and rotatable in opposite directions such that the cylindrical surfaces move in the same direction at the restricted zone;
   (b) a set of hooked rods on each drum, each hooked rod including a rod portion and a hook portion and extending generally radially outwardly from one of the cylindrical surfaces so that the hook portion of each rod faces generally upwardly within the restricted zone, the hooked rods on each drum forming an array of rods of selected density such that as the drums rotate the sets of hooked rods pass juxtaposedly through the restricted zone at the combined density of the arrays of rods of both drums to optimize the engagement of the clusters by the rods as the vegetable pods fall through the restricted zone, the hooked rods passing outwardly and away from the restricted zone at the respective single array density of each drum so that the clusters are carried away from the zone at a lesser density than in the restricted zone; and
   (c) a drive system connected to the drums to rotate them.

5. The tandem drum cluster separator specified in claim 4 wherein the drums rotate so that the cylindrical surfaces and hooked rods move downwardly within the restricted zone.

6. The tandem drum cluster separator specified in claim 5 further including at least one sickle cutter assembly located below at least one of the two drums in generally parallel relation to an axis of the drum and facing inwardly toward the other drum to receive clusters moving outwardly from the restricted zone and cut the vegetable pods from the stems so that the pods fall and the stems are carried outwardly away from the pods to be dropped as the hooked rods move upwardly.

7. The tandem drum cluster separator specified in claim 6 further including a sickle drive assembly connected to the drive system and to the sickle cutter assembly to drive the sickle cutter assembly with power from the drive system, said sickle drive assembly including an eccentric drive rod assembly which is connected to the sickle cutter assembly to provide a repetitive oscillating cutting motion.

8. The tandem drum cluster separator specified in claim 4 wherein each drum further includes an end guard attached to each end of the drum cylindrical portion, each end guard extending outwardly from the drum cylindrical portion in overlapping relation to an end guard of the adjacent drum to substantially enclose the restricted zone.

9. The tandem drum cluster separator specified in claim 4 wherein the hooked rods have a length Which is slightly less than a shortest distance between the cylindrical surfaces of the drums so that each hooked rod is able to extend from one drum surface substantially across the restricted zone without contacting the other drum suface.

10. The tandem drum cluster separator specified in claim 4 wherein each array of hooked rods comprises a selected number of rods arranged in a pattern, and wherein the drums are so positioned with respect to each other that, within the restricted zone, the hooked rods of the combined arrays of rods of the two drums are arranged in a substantially uniform pattern.

11. The tandem drum cluster separator specified in claim 4 wherein the drums rotate so that the cylindrical surfaces and hooked rods move upwardly within the restricted zone to pull clusters up and out over the drums, to be dropped at an outer side of each drum.

12. The tandem drum cluster separator specified in claim 4, wherein the hook portion of each hooked rod is perpendicular to the rod portion.

13. A tandem drum cluster separator for engaging and separating clusters of vegetables pods joined together by stem sections from a large quantity of individual vegetable pods, the device comprising:
   (a) a frame;
   (b) two tandem drums which each include a cylindrical portion with a cylindrical surface, the two drums being substantially horizontally spaced and forming a restricted zone between their cylindrical surfaces, the drums being mounted to the frame and rotatable in opposite directions such that the cylindrical surfaces move in the same direction at the restricted zone;

(c) a set of hooked rods on each drum, each hooked rod including a rod portion and a hook portion and extending generally radially outwardly from one of the cylindrical surfaces with the hook portion of each rod facing generally upwardly within the restricted zone, the hooked rods on each drum forming an array of selected density such that the sets of hooked rods pass juxtaposedly through the restricted zone at a combined density of the arrays of both drums to optimize the engagement of the clusters by the rods as the vegetable pods fall through the restricted zone, the hooked rods passing outwardly and away from the zone at the respective single array density of each drum so that the clusters are carried away from the zone at a lesser density than in the restricted zone;

(d) a drive system connected to the drums to rotate them;

(e) a feed assembly located above the restricted zone, the feed assembly having a discharge edge over which the vegetable pods fall into the restricted zone; and (f) means located below the restricted zone for receiving the vegetable pods which have fallen through the restricted zone for further processing.

14. The separator specified in claim 13 wherein the drums rotate so that the cylindrical surfaces and hooked rods move downwardly within the restricted zone and the clusters which are caught by the hooked rods are carried downwardly and outwardly under the drums.

15. The separator specified in claim 14 further including at least one sickle cutter assembly located below at least one of the two drums in generally parallel relation to a longitudinal axis of the drum and facing inwardly toward the other drum to receive the clusters moving outwardly from the restricted zone and cut the vegetable pods from the stems so that the pods fall into the means for receiving the vegetable pods and the stems are carried outwardly by the hooked rods and dropped separately.

16. The separator specified in claim 15 further including a sickle drive assembly connected to the drive system and to the sickle cutter assembly to drive the sickle cutter assembly with power from the drive system, said sickle drive assembly including an eccentric drive rod assembly which is connected to the sickle cutter assembly to provide a repetitive oscillating cutting motion.

17. The separator specified in claim 13 wherein each drum further includes an end guard attached to each end of the drum cylindrical portion, each end guard extending outwardly from the drum cylindrical portion in overlapping relation to an end guard of the adjacent drum to substantially enclose the restricted zone.

18. The separator specified in claim 13 wherein the hooked rods have a length which is slightly less than a shortest distance between the cylindrical surfaces of the drums so that each hooked rod is able to extend substantially across the restricted zone.

19. The separator specified in claim 13 wherein each array of hooked rods comprises a selected number of rows of rods, adjacent hooked rods within each row are equidistant, and adjacent rows of each array are equidistant and are shifted with respect to each other so that points which are midway between two adjacent hooked rods within a row are circumferentially adjacent to one of the hooked rods in the adjacent row.

20. The separator specified in claim 19 wherein the drums are rotationally positioned with respect to each other so that, within the restricted zone, locations which are midway between two adjacent hooked rods of each drum are occupied by hooked rods of the other drum.

21. The separator specified in claim 13 wherein the drums rotate so that the cylindrical surfaces and hooked rods move upwardly within the restricted zone to pull clusters up and out over the drums, to be dropped at an outer side of each drum.

22. The separator specified in claim 13 wherein the hook portion of each hooked rod is perpendicular to the rod portion.

* * * * *